United States Patent [19]

Ross

[11] Patent Number: 4,751,360

[45] Date of Patent: Jun. 14, 1988

[54] APPARATUS FOR THE CONTINUOUS INDUCTION HEATING OF METALLIC STRIP

[76] Inventor: Nicholas V. Ross, Lockwood Blvd., Youngstown, Ohio 44511

[21] Appl. No.: 66,457

[22] Filed: Jun. 26, 1987

[51] Int. Cl.$^4$ .............................................. H05B 6/40
[52] U.S. Cl. ............................ 219/10.61 R; 219/10.43; 219/10.71; 219/10.79
[58] Field of Search ................ 219/10.61 R, 10.69, 219/10.71, 10.73, 10.79, 10.43, 10.49 R

[56] References Cited

U.S. PATENT DOCUMENTS

| | | | |
|---|---|---|---|
| 2,448,012 | 8/1948 | Baker | 219/10.61 R |
| 2,902,572 | 9/1959 | Lackner et al. | 219/10.61 R |
| 3,031,555 | 4/1962 | Ross | 219/10.79 |
| 3,766,353 | 10/1973 | Barbieux | 219/10.61 R |
| 4,054,770 | 10/1977 | Jackson et al. | 219/10.61 R |
| 4,587,392 | 5/1986 | Chaussé et al. | 219/10.71 |

Primary Examiner—Philip H. Leung

[57] ABSTRACT

Apparatus and method for transverse flux heating of metal strips, continuously moved in spaced proximity to induction heating inductor assemblies, comprised of conductors and flux guides; the conductors having relatively straight portions extending generally parallel to the strip surface and perpendicular to the length of the strip and curved or tapered portions, the curved portion of the conductors adapted to be positioned adjacent to the edges of the strip to control the current distribution within the strip and to maintain a uniform temperture distribution across the strip to avoid distortion of the strip and thereby allowing the use of high power densities. The inductor assemblies may be adjustable and if adjustable, may be adjusted to evenly heat strips of variable width and thickness.

6 Claims, 5 Drawing Sheets

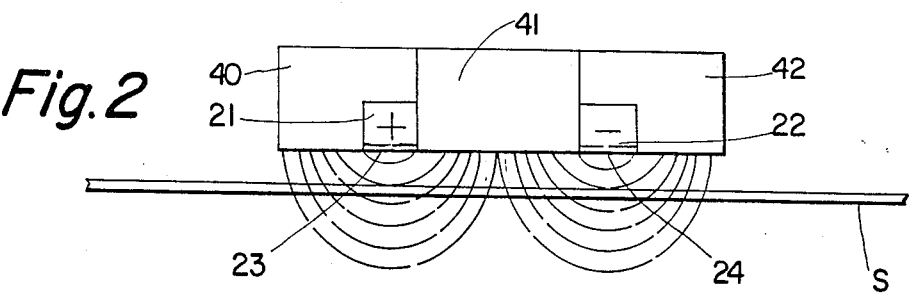
Fig. 2
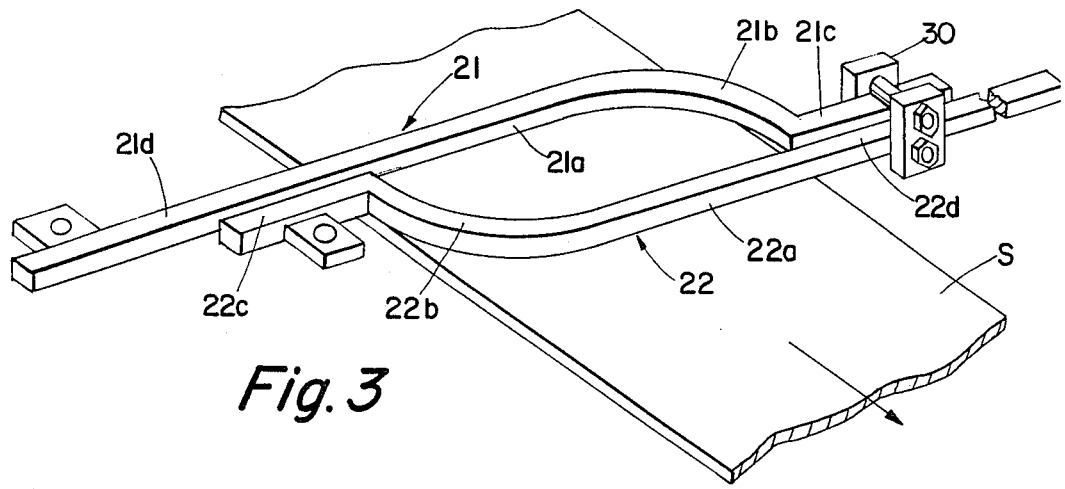
Fig. 3
Fig. 4
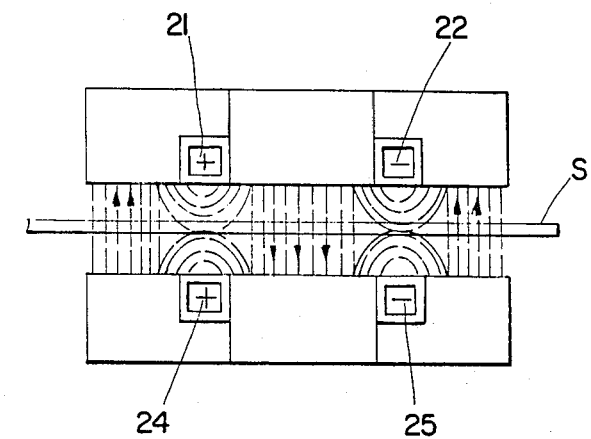
Fig. 7

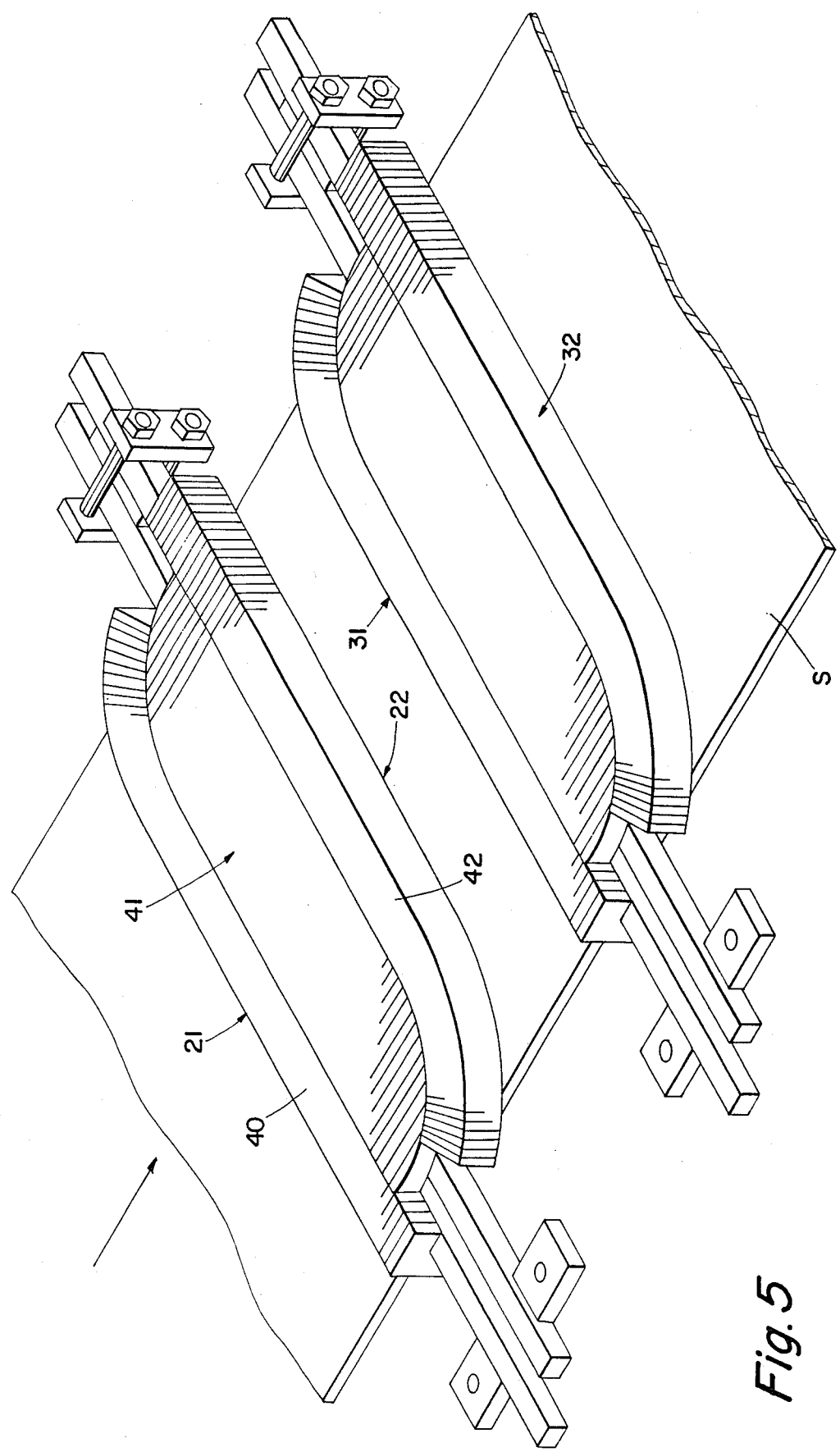

APPARATUS FOR THE CONTINUOUS INDUCTION HEATING OF METALLIC STRIP

This invention relates to transverse flux heating and more particularly to the inductive heating of continuously moving metal sheet, strip or plate.

BACKGROUND OF THE INVENTION

In the induction field, it has been known that when an inductor carrying alternating current is positioned in proximity to a conducting surface, a current will flow within that conducting surface producing heating effect proportional to the square of the current density within the conducting surface. If conductors carrying currents of the same phase are placed opposite each other on each side of a strip of conducting metal, it would produce a magnetic field that is essentially perpendicular to the strip. This type of heating that results, has been described as transverse flux heating.

The term "transverse flux heating" as used herein applies to all configurations wherein the axis of the induction coil is substantially perpendicular to the plane of the sheet so that the resulting electromagnetic flux will also tend to be in a direction transverse to said plane. By contrast in conventional induction heating, a solenoidal coil surrounds the sheet with its axis parallel to said plane, and the resulting flux is parallel to said plane, and also parallel to the direction of the continuous motion of the sheet.

Another distinguishing mark of transverse flux heating devices is the use of magnetic flux guides in conjunction with the conductors of the induction coil. These flux guides are disposed so as to further enhance the flux in a direction transverse to said sheet.

The entire flux produced by a transverse flux heating coil will pass through the sheet from one side to the other only if the frequency of the alternating current applied to the coil is relatively low. As said frequency is increased, currents induced in the sheet produce an increasingly significant counter-flux, so that only a fraction of the primary coil flux transverses the sheet. If the frequency is further increased to extremely high values, entirely separate flux patterns will form on each side of the sheet, and virtually no flux passes through the sheet. External to the sheet, the direction of the flux then will still be transverse but within the strip most of the flux lines will be parallel to the plane of the sheet. This phenomenon, not withstanding, the term transverse flux heating is applied to all devices which produce a substantially transverse flux when no sheet is present.

It can also be shown that at relatively low frequency, the current density at any one point on the sheet remains substantially constant throughout the thickness of the sheet even if an inductor is applied only to one side of the strip. At relatively high frequency, however, the current density at any one point of the sheet will greatly decrease from the surfaces inward, and then it will be necessary to apply inductors to both sides of the strip to obtain uniform temperature in the strip.

The actual range of frequencies producing these changing effects in a given sheet will depend on the thickness, electrical resistivity, magnetic permeability, configuration of the heating coil, and density of the induced current. Most practical transverse flux heating applications will be found to lie between the extremes cited above, i.e., the operating frequency is such that a significant fraction of the flux will transverse the sheet, but the current distribution over the thickness at any one point will be non-uniform and therefore an installation utilizing a coil on one side of the strip may produce non-uniform temperature distribution through the thickness of the strip.

Robert E. Baker, in U.S. Pat. No. 2,448,012, attempts to utilize transverse flux heating to process continuously moving strip. Because of difficulty in heating the strip uniformly, Baker attempts to modify the field distribution by introducing shielding means at the strip edges. The use of shielding means causes loss of energy and decreases the efficiency of the transverse flux heater. Lackner, U.S. Pat. No. 2,902,572, also attempts to obtain uniform heating and disposes a core structure arranged so that strip passing therethrough is heated by a current which passes diagonally across the width but does not secure uniform heating, particularly for variable width strip.

Other inventors such as Jackson, et al, U.S. Pat. No. 4,054,770, have addressed the said problem by suggesting the use of wedge shaped appendages on the surface of the pole faces used in the transverse inductor assembly. In the same reference, it is suggested to use arrays formed from multiple inductors of the same construction to produce a uniform heating effect. Neither construction of Jackson's lends itself to uniform heating of strips of variable widths.

Throughout the world, few commercial installations utilizing transverse flux heating of strip have been made and those have been limited to fixed width strip and utilize relatively low power density.

SUMMARY OF THE INVENTION

This invention relates to a novel inductor assembly that will produce the necessary transverse magnetic flux field distribution that will result in a uniform product temperature across the width of the strip as it passes through the influence of the inductor assembly. This is accomplished by a unique shaping of the conductors and by use of flux guides adjacent to these conductors to produce the magnetic field. The active portion of the inductor which is opposite the surface of the strip is shaped in the form of a "J" with a substantial portion of the conductor straight and aligned perpendicular to the axis of the strip to be heated and parallel to the surface of the strip. The remaining portion of the "J" extends toward the mating conductor and the two conductors, which are essentially identical but reversely mounted, form a loop which essentially covers the surface of the strip to be heated. Extending from each end of the "J" and external to the active portions of the inductor assembly are conductors which are used to electrically connect the sections in series. These extensions are closely spaced to reduce any external heating effect. Flux guides are placed on the active portions of the "J" shaped conductors on the three sides thereof that are not facing the strip. These flux guides are preferably made from material with a relative permeability greater than 5 and are positioned on the conductors so that the induction heating current will produce a field which is essentially transverse to the plane formed by the strip. Additional power can be provided to the strip to meet higher production rates by placing additional units along the length of the strip. In the instance where the application utilizes higher frequencies where the strip thickness becomes significant, it is possible to position an inductor assembly on the opposite side of the strip so that the induced current from each inductor flows in generally the same path and an equivalent heating effect is produced. Again, multiple inductor assemblies can be disposed in spaced relation along the length of the strip and may be employed to achieve higher power capability. I have found that this construction provides even heating of the strip and in fact by proper adjustment, the temperature of the edge can be controlled so that it is either equal to, greater than, or less than the temperature of the central portion of the strip.

It is the object of this invention to produce a current path in the load to heat the strip and control the amount of residence of the current at the load edges to achieve uniform heating of the workpiece across its width.

A further object of this invention is to provide for transverse flux heating of strip or plate wherein a uniform heat pattern is substantially achieved over the width of strip or plate.

Another object of the invention is to provide apparatus whereby adjustment of the inductor may be easily made.

Other objects of the invention and the invention itself will become more readily apparent from a purview of the following description in which reference is made to the accompanying drawings, in which drawings:

IN THE DRAWINGS

FIG. 2 is a cross sectional view of the inductor of FIG. 1 disposed over the strip passing therethrough and showing the lines of flux and the flux pattern;

FIG. 3 is a perspective view of the inductor of FIG. 1 as adjusted for the passage of relatively narrow strip, the magnetic flux guides omitted for clarification;

FIG. 4 is a view of the inductor similar at FIG. 3 but illustrating the passage of relatively wider strip therethrough;

FIG. 5 illustrates two inductor assemblies of the type shown in FIG. 1 placed in spaced relation side-by-side along the length of the strip;

FIG. 7 is a view similar to FIG. 2 but showing the lines of flux obtained in the form of the invention shown in FIG. 6.

Figure 1:
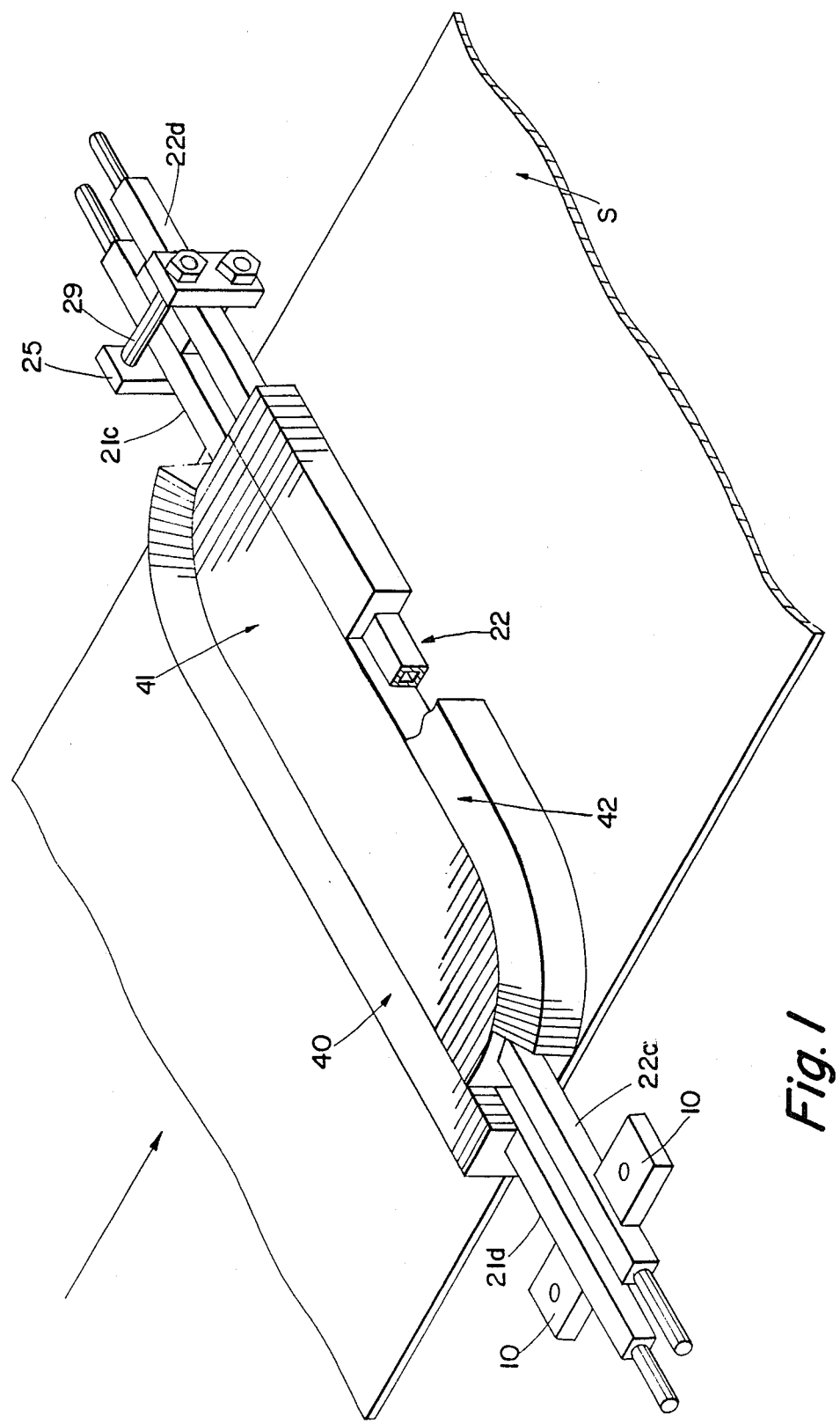
FIG. 1 is a perspective cut-away view of one form of the inductor of this invention.

Referring now more specifically to the drawings and in particular to the forms of this invention shown in FIGS. 1, 2, 3, 4, and 5, the induction coil of the invention comprises a pair of shaped conductors 21 and 22; consisting of relatively straight portions 21a and 22a, and relatively curved end portions 21b and 22b adapted to be positioned in proximity of opposite edges of continuously moving metal strip"s" passing therethrough. The length of the straight portions 21a and 22a are preferably at least one half of the strip width, and in combination with the curved portions 21b and 22b form the active mid-section of the induction coil. The active portion of conductors 21 and 22 i.e., straight sections 21a and 22a and the curved shaped sections 21b and 22b, are partially enclosed in flux guides 40, 41 and 42. Straight extensions 21c, 21d, 22c and 22d of the conductors 21 and 22 are closely spaced to reduce any external heating effect and extend the conductors 21 and 22 beyond or outwardly of the strip for the purpose of making connections 10 to the power supply (not shown) and of making an electrical series connection between the conductors 21c and 22d, said flux guides disposed on the sides of the conductors which do not face the strip. These guides are preferably made from material with a relative permeability of greater than 5.

Referring to FIG. 2, it will be noted that the magnetic flux guides 40, 41 and 42 are positioned on the conductors so that the induction heating current will produce a field which is substantially transverse to the plane formed by the strip. It will be noted that the flux guide 41 is interposed in the space between the conductors 21 and 22. As shown in FIG. 2, the guides 40, 41, and 42 surround three sides of each of the conductors 21, 22 thus forcing the induction heating current to flow as shown in FIG. 2 on the surface of the conductor facing the strip so that only the face of the strip opposite the active face 23, 24 of the conductors 21 and 22 respectively, is heated.

It will be noted that in the embodiment of FIGS. 1 to 4 inclusive the use of a pair of essentially identical J-shaped conductors 21 and 22 each having a substantial portion 21a and 22a straight and aligned perpendicular to the axis of a metallic strip to be heated and parallel to the surface of the strip are shown. The remaining portion of the "J" of each conductor, as shown at 21b and 22b, is curved and extends toward an end of the straight portion 22e and 21d respectively of the mating conductor and the two conductors which are essentially identical in shape but reversely mounted for a loop substantially covering the width of the strip to be heated. A source of relatively low operating alternating current frequency is preferably applied in this form of the invention in which most of the flux passes through the sheet from one side to the other and the current distribution and heating pattern is guided and controlled by the flux guides 40, 41 and 42 at all times. This embodiment is well suited to relatively low power applications as well as those with less critical requirements of temperature uniformity.

FIGS. 3 and 4 illustrate the manner in which the inductor may be adjusted to heat varying widths of strip. Referring again to FIG. 1, and to flux guide 41, it will be noted that to make the adjustment, the flux guide 41 is removed from between conductors 21 and 22 and the clamp mechanism 30 loosened so that the conductors 21 and 22 can be shifted to their new position as for example shown in FIG. 4. A new assembly of suitably dimensioned flux guide material 41 is then reinserted in the opening formed between conductors 21 and 22. Additional power capability for an installation can be realized by placing additional inductor assemblies along the length of the strip as shown in FIG. 5 which shows two such assemblies A and B, in spaced relation over the strip"s".

A second and more costly embodiment of the invention will be favored when the operating frequency is relatively higher so that, as explained earlier, only a fraction of the flux will ordinarily transverse this sheet from one side to the other.

Figure 6:
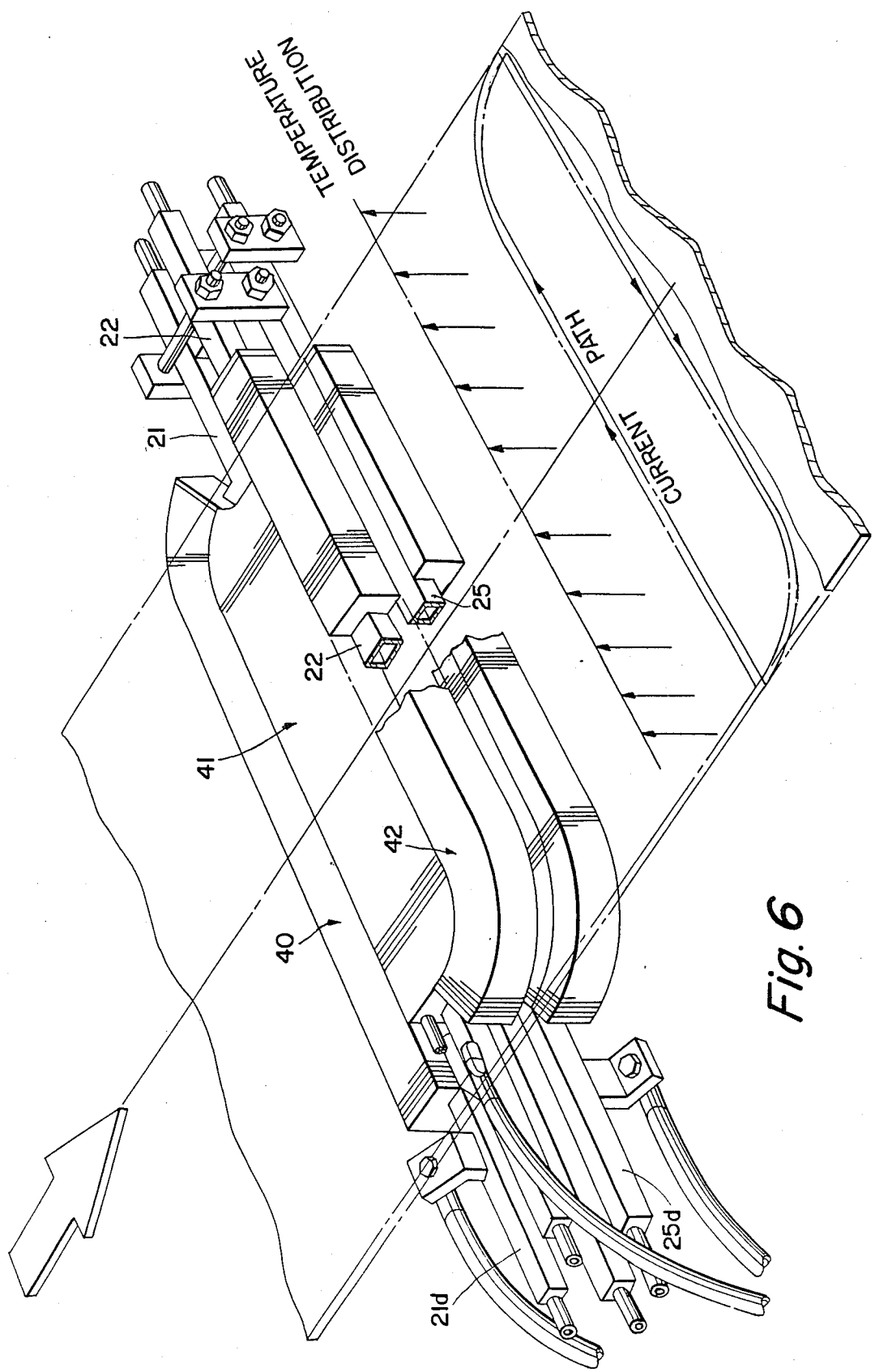
FIG. 6 is a perspective view of the type of inductor shown in FIG. 1 illustrating the flux guides disposed on the three sides of the conductors not facing, the strip passing therethrough and showing one of said inductors on one side of the strip and another on an opposite side thereof.

In FIG. 6, inductor assemblies similar to those described above are placed on either side of the strip and connections to the power supply, and between the loops are made in such a way that the current in conductors 21 and 22 are in electrical series as well as the current in conductors 24 and 25; so that current in conductors on said opposite sides of the strip flow in the same direction. Flux guides partially enclose each conductor and form both a first and second inductor assembly on opposite sides of the strip forming a pair of pole assemblies. This will assure that the maximum possible percentage of the flux will be transverse to the strip and thus provide the heating effect desired. The curved ends are, as illustrated disposed adjacent to the edge of the strip 18 to allow a controlled residence of the current in those portions of the strip and thus insure uniform heating of the workpiece. In the preferred form, every part of the strip or workpiece eventually receives an equal amount of energy and therefore attains a relatively uniform temperature. Edge heating of the strip can be controlled by extending the inductor beyond the edge of the workpiece to achieve overheating or by retracting the inductor within the edges of the strip to achieve underheating of the edges.

Once again, multiple inductor assemblies as shown in FIG. 5, can be used along the length of the strip to provide even higher power densities than had been heretofore possible.

Figure 8:
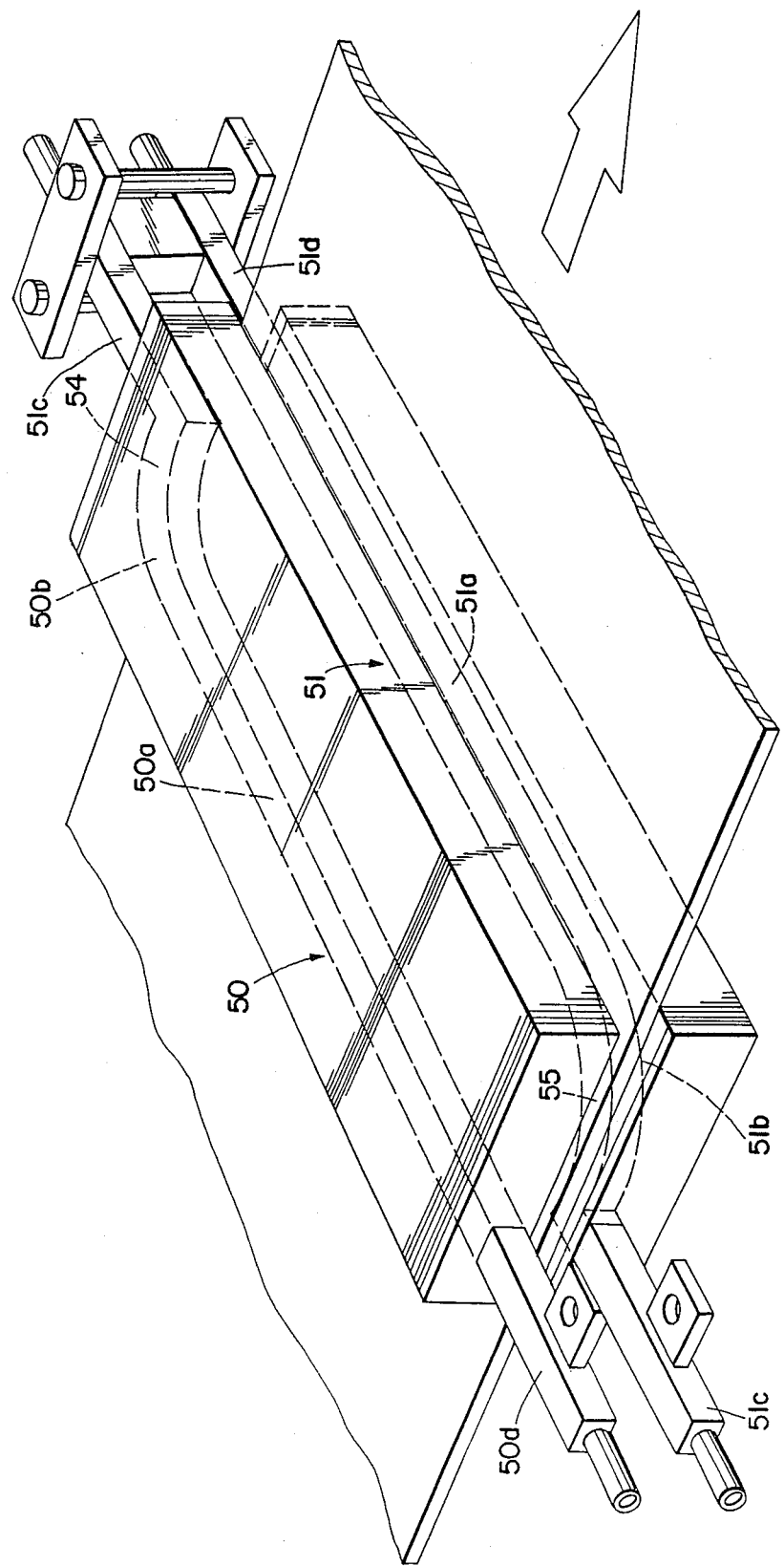
FIG. 8 is a perspective view of an upper conductor and a lower conductor disposed respectively above and below strip passing therethrough.

In a further embodiment, as shown in FIG. 8, a pair of conductors 50 and 51 form the inductor assembly, the conductors each consist of relatively elongated straight portions 50a and 51a and relatively curved end portions 50b and 51b respectively, and the conductor 50 is placed above the strip and the conductor 51 is placed below the same whereby the strip passes between the upper and lower conductors. The active portions of the conductors are partially enclosed in magnetic flux guides. Straight extensions 50c, 50d and 51c, 51d are used as described earlier to make electrical connections to the conductors external to the strip. The said conductors are reversely positioned to form a loop.

Every part of the strip or workpiece eventually receives an equal amount of energy. The frequency of the power supply to achieve maximum density depends upon the thickness and electrical conductivity of the strip to be heated. The edge temperature can be controlled as stated hereinbefore by overheating or underheating and the curved ends of the inductor reduce the temperature differential across the strip and lessens distortion of the same. The design construction can be varied as desired to overheat or underheat the edges as stated.

While I have described my invention in connection with preferred embodiments, it will be understood that all conductors of my invention employ curved or otherwise tapered ends which provide a controlled current residence adjacent the edges of the strip and adjustment means may be employed therewith for adjusting the length of the inductor to accomodate different widths of strip. The conductors should maintain a relatively elongated substantially straight portion perpendicular to the workpiece passing therethrough and a curved, semi-circular or tapered end extending therefrom and adapted to be juxtaposed adjacent the edges of the said workpiece A pair of so-formed conductors may be placed above the strip, or a pair of each above and below the strip passing therethrough, or a single conductor may be disposed above and one below the strip to form the inductor assemblies. The spacing of the inductors from the strip can be varied to accomodate different thicknesses thereof. Also various types of clamping means and power leads may be employed.

It will also be apparent that numerous and extensive departures in the flux guides, their placement, etc., and other departures may be made in the embodiments of my invention without however departing from the spirit of my invention and the scope of the appended claims.

What I claim is:

1. Apparatus for transverse flux induction heating of continuously moving metal strip; said apparatus consisting of one or more single-loop inductors each comprising two substantially identical shaped conductors; each said shaped conductor comprising an active J-shaped mid-section extending substantially over the width of said strip with a straight portion oriented substantially perpendicular to the direction of strip travel and a curved portion, straight extensions at both ends of said mid-section which are parallel to each other and also oriented substantially perpendicular to the direction of strip travel; said two shaped conductors being positioned opposite but reverse with respect to each other so that their straight extensions are in close proximity to each other, clamping means connecting said extensions joining the same electrically and mechanically only on one end; a supply of alternating current connected to terminals on the straight extensions on the opposite end; magnetic flux guides positioned to surround each said J-shaped mid-section on three sides of said mid-section of the conductors which are not facing the strip; said two conductors thereby forming an elongated single loop with its long dimension oriented substantially perpendicular to the direction of strip travel; the curved portions of said J-shaped mid-sections in optimal close relationship to the edges of said strip thereby achieving a high degree of temperature uniformity across the width of said strip.

2. Apparatus as claimed in claim 1 wherein said clamping means adjustably connect said extensions so as to adjust the long dimension to position the curved portions in substantially the same optimal close relationship to the edges of said strip whenever a change in strip width occurs.

3. Apparatus according to claim 1 wherein the two shaped conductors forming each single-loop inductor lie in one plane parallel to the strip plane, whereby each said inductor faces only one side of said strip.

4. Apparatus according to claim 1 wherein the two shaped conductors forming each single-loop inductor lie in two different planes parallel to the strip plane on opposite sides of said strip.

5. Apparatus according to claim 1 wherein the single-loop inductors are arranged in pairs, said inductors of each pair facing each other on opposite sides of said strip, one inductor being substantially a mirror image of the other with respect to the strip plane, and the supply of alternating current of the same phase to said inductors of a pair being connected so as to cause their fields to boost each other, the instantaneous currents in one to represent a mirror image throughout with respect to the strip plane of the instantaneous currents in the opposite inductor.

6. Apparatus for transverse flux induction heating of continuously moving metal strip; said apparatus consisting of one or more single-loop inductors each comprising two substantially identical shaped conductors; each said shaped conductor comprising an active J-shaped section extending substantially over the width of said strip with a straight portion oriented substantially perpendicular to the direction of strip travel and a curved portion; said two shaped conductors being positioned opposite but reverse with respect to each other, a supply of alternating current, magnetic flux guides positioned to surround each said J-shaped mid-section on three sides of said mid-section of the conductors which are not facing the strip; said two conductors thereby forming an elongated single loop with its long dimension oriented substantially perpendicular to the direction of strip travel; the curved portions of said J-shaped mid-sections in optimal close relationship to the edges of said strip thereby achieving a high degree of temperature uniformity across the width of said strip.

* * * * *

UNITED STATES PATENT AND TRADEMARK OFFICE
CERTIFICATE OF CORRECTION

PATENT NO. : 4,751,360

DATED : June 14, 1988

INVENTOR(S) : Nicholas V. Ross

It is certified that error appears in the above-identified patent and that said Letters Patent is hereby corrected as shown below:

Title page, item [73] should be inserted as follows:

-- ASSIGNEE: AJAX MAGNETHERMIC CORPORATION
Warren, Ohio --

Signed and Sealed this

Seventh Day of March, 1989

Attest:

DONALD J. QUIGG

Attesting Officer

Commissioner of Patents and Trademarks